(12) United States Patent
Whitman et al.

(10) Patent No.: US 12,167,060 B2
(45) Date of Patent: Dec. 10, 2024

(54) CONTENT IDENTIFICATION WITH PRIVACY AND SECURITY

(71) Applicant: TURNER BROADCASTING SYSTEM, INC., Atlanta, GA (US)

(72) Inventors: Brian A. Whitman, Brooklyn, NY (US); Erica R. Greene, Boston, MA (US); Benjamin Recht, Berkeley, CA (US)

(73) Assignee: TURNER BROADCASTING SYSTEM, INC., Atlanta, GA (US)

( * ) Notice: Subject to any disclaimer, the term of this patent is extended or adjusted under 35 U.S.C. 154(b) by 0 days.

(21) Appl. No.: 16/667,331

(22) Filed: Oct. 29, 2019

(65) Prior Publication Data

US 2020/0137438 A1    Apr. 30, 2020

Related U.S. Application Data

(60) Provisional application No. 62/752,897, filed on Oct. 30, 2018.

(51) Int. Cl.
| | |
|---|---|
| *H04N 21/25* | (2011.01) |
| *G06F 17/16* | (2006.01) |
| *H04L 67/306* | (2022.01) |
| *H04N 21/258* | (2011.01) |
| *H04N 21/442* | (2011.01) |
| *H04N 21/45* | (2011.01) |
| *H04N 21/475* | (2011.01) |

(52) U.S. Cl.
CPC ......... *H04N 21/252* (2013.01); *G06F 17/16* (2013.01); *H04L 67/306* (2013.01); *H04N 21/258* (2013.01); *H04N 21/44224* (2020.08); *H04N 21/4532* (2013.01); *H04N 21/4755* (2013.01)

(58) Field of Classification Search
CPC ............ H04N 21/4532; H04N 21/252; H04N 21/258; H04N 21/4755; H04N 19/00; H04N 21/25891
See application file for complete search history.

(56) References Cited

U.S. PATENT DOCUMENTS

| | | | | |
|---|---|---|---|---|
| 5,758,257 | A * | 5/1998 | Herz | H04N 7/14 |
| | | | | 725/116 |
| 6,404,923 | B1 * | 6/2002 | Chaddha | G06T 9/008 |
| | | | | 382/224 |
| 7,047,281 | B1 * | 5/2006 | Kausik | H04L 67/06 |
| | | | | 709/213 |
| 10,616,255 | B1 * | 4/2020 | Strauss | H04L 63/1425 |

(Continued)

*Primary Examiner* — Jason Salce
(74) *Attorney, Agent, or Firm* — Bookoff McAndrews, PLLC (57) ABSTRACT

Disclosed examples can relate to obtaining identifications of content (e.g., content recommendations) while keeping at least some interaction data locally private. For a given user and device, content items for which the user may have an affinity can be predicted based on the interactions of the user with other content items. Respective interaction data for respective content items can stay local to the user device by transforming the respective content items into content codes (e.g., determined based on a codebook generated by clustering perceptual values). The affinity for content codes can be transmitted to the server for use in determining identifications of content items to provide to the device.

17 Claims, 9 Drawing Sheets

(56) References Cited

U.S. PATENT DOCUMENTS

| | | | | |
|---|---|---|---|---|
| 2003/0229892 | A1* | 12/2003 | Sardera | H04N 21/44224 725/110 |
| 2004/0073924 | A1* | 4/2004 | Pendakur | H04N 21/4756 725/46 |
| 2005/0010955 | A1* | 1/2005 | Elia | G06F 16/743 725/38 |
| 2008/0104624 | A1* | 5/2008 | Narasimhan | H04H 60/66 725/13 |
| 2013/0156348 | A1* | 6/2013 | Irani | G06F 16/5854 382/305 |
| 2013/0173263 | A1* | 7/2013 | Morii | H04N 19/94 704/230 |
| 2013/0259375 | A1* | 10/2013 | Dunlop | G06K 9/00718 382/173 |
| 2013/0318351 | A1* | 11/2013 | Hirano | H04L 9/3231 713/168 |

* cited by examiner

CONTENT IDENTIFICATION WITH PRIVACY AND SECURITY

CROSS-REFERENCE TO RELATED APPLICATIONS

This application claims priority to, and the benefit of, U.S. Provisional Patent Application No. 62/752,897, filed Oct. 30, 2018, which is hereby incorporated by reference in its entirety for any and all purposes.

TECHNICAL FIELD

The present application generally relates to improved content identification systems and methods that have improved privacy and security by keeping certain data locally private.

BACKGROUND

Conventional frameworks for personalization of content identification include collaborative filtering using matrix factorization. In such techniques, a user-item matrix M is built, where M(u,j) is a known affinity between a user u and a content item j. By factorizing the matrix M using, for example, a singular-value decomposition (SVD) into a lower-rank version of the matrix M and then reconstituting the matrix M into M', unknown items in the matrix M can be predicted. For example, if a user u had not heard a song k, an example procedure according one embodiment, leaves a zero value for M(u,k), factorizes and reconstitutes M' from the latent item and user vectors, and looks up M'(u,k) to obtain a predicted affinity value. But one significant issue with this method is that a server can (and typically does) store the entire known parts of the matrix M, which can reveal interactions between users and content items, thus leaving the personalized data potentially vulnerable to data breaches or unwanted use.

SUMMARY

In an example, there is a method comprising: for each respective content item of a set of content items: determining an affinity value for the respective content item; and determining a classification code for the respective content item; creating an affinity vector from the determined affinity values and the classification codes; transmitting the affinity vector to a server; and receiving, from the server, one or more identification of content items based on the transmitted affinity vector.

In an example, determining the classification code includes: determining a perceptual value for the content item. The classification code can be based on the perceptual value. Determining the classification code can include determining the classification code based on the perceptual value using a codebook. The method can further include receiving the codebook from the server. The method can further include generating the codebook based on clustering performed on perceptual values. Determining the affinity value can be based on data regarding one or more interactions with the respective content item. In an example, the data regarding the one or more interactions is not transmitted to the server. In an example, the method further includes combining multiple affinity vectors, each associated with a different content type, to form a combined affinity vector. Transmitting the affinity vector to the server includes transmitting the affinity vector as part of the combined affinity vector. In an example, the method further includes obscuring the affinity vector prior to transmitting the affinity vector to the server. The method can be performed by a local content personalization engine operating on a user device.

In an example, there is a method comprising: obtaining affinity vectors from user devices; updating a server matrix using the affinity vectors; determining identification of content items for a respective user device of the user devices based on the server matrix; and transmitting the identification of content items to the respective user device. In an example, the affinity vectors include associations between affinity values and classification codes. In an example, the method further includes generating a codebook based on clustering performed on perceptual values of content items; and transmitting the codebook to the user devices for use in determining one or more classification codes. In an example, the method further includes decomposing the server matrix, wherein the identification of content items are based on results of decomposing the server matrix. In an example, the method is performed by a server.

In an example, there is a non-transitory computer-readable medium comprising instructions. The instructions, when executed by one or more processors, cause the one or more processors to: for each respective content item of a set of content items: determine an affinity value for the respective content item; and determine a classification code for the respective content item; create an affinity vector from the determined affinity values and the classification codes; transmit the affinity vector to a server; and receive, from the server, one or more identification of content items based on the transmitted affinity vector. In an example, to determine the classification code includes to determine a perceptual value for the content item. The classification code can be based on the perceptual value. To determine the classification code can further include to determine the classification code based on the perceptual value using a codebook received from the server. In an example, to determine the affinity value is based on data regarding one or more interactions with the respective content item. In an example, the data regarding the one or more interactions is not transmitted to the server.

In an additional example, there is a method of exchanging private information. The method can include various operations. The method can include generating a matrix M containing a plurality of affinity values between a plurality of devices and a plurality of items, correspondingly, and generating k clusters based on the affinity values in the matrix M, each cluster having a cluster value. The method can further include assigning a code to each cluster value to generate a cluster value code, and assigning a cluster value to each item of the plurality of items. The method can still further include generating a code book model containing each item of the plurality of items and the cluster value code assigned to the item, and sending the code book model to a remote device; receiving, from the remote device, a code book vector having a plurality of cluster value codes and at least one affinity value associated with one or more cluster value codes, wherein the at least one affinity value relates to at least one item found on the remote device. The received code book vector can be incorporated into the matrix M.

The method can further include generating one or more recommendations for the remote device based on the received code book vector; and sending the recommendations to the remote device. In an example, the k clusters are generated using k-means clustering, PCA clustering, t-SNE clustering, hierarchical clustering, or VQ clustering. In another example the method is performed by executing instructions stored in a computer readable medium device coupled to one or more processors.

In another example, there is a method of exchanging private information. The method can include: receiving from a server a code book model containing a list of items and a cluster value code for each item in the list; generating, by a remote device, a code book vector having one or more cluster value codes representing one or more items located within the remote device and an affinity value associated with the one or more cluster value codes, wherein the affinity value is determined, at least in part, by the one or more items on the remote device associated with the cluster value code; and sending the code book vector to a server.

The method can further include adding noise to one or more affinity values of the code book vector before sending the code book vector to the server. The method can further include receiving, from the server, one or more recommendations for the items based, at least in part, on the code book vector.

BRIEF DESCRIPTION OF THE DRAWINGS

The features and advantages of the example embodiments of the invention presented herein will become more apparent from the detailed description set forth below when taken in conjunction with the following drawings.

DETAILED DESCRIPTION

Disclosed examples include methods, systems and computer program products for obtaining personalized identification of content items while keeping at least some personal interaction data locally private. In an example implementation, a server-based identification engine cooperates with a local personalization engine that keeps certain data locally private to a user device. The identification engine can identify content items (e.g., content items recommended for a user of the user device). For instance, for a given user and device, content items for which the user may have an affinity can be identified based on the interactions of the user with other content items. Interaction data for respective content items can stay local to the user device by transforming the respective content items into content classification codes (e.g., determined based on a codebook generated by clustering perceptual values). In turn, the affinity of a user for particular content codes can be transmitted to the server for use in determining identifications of content items. The affinity of the user can be expressed as an affinity value obtained based on express (e.g., receiving data that expressly identifies that the user has an affinity for content, such as by actuation of a like button) or inferred (e.g., inferring the affinity based on an amount of time the user spent reading a content item). The server can obtain access to a latent projection that is relatively hard to invert to determine underlying interaction data that corresponds to the user. The server can then receive and aggregate the affinity values for content codes across multiple users for use in identifying content to provide to the individual users (e.g., as a recommendation of the identified content). This technology enables the server to provide personalized identifications of content items (e.g., personalized discovery of recommended content items) to a user without an external service obtaining access to the individual interactions of a user which would otherwise be accessible from conventional techniques. Thus, disclosed examples that transmit affinity for classification codes to the server provides technical advantages over prior technology of identifying content items by reducing the amount of personal data exposed to the server to obtain identifications of content items. An example identification engine is implemented using the system described in FIG. 1.

System

Figure 1:
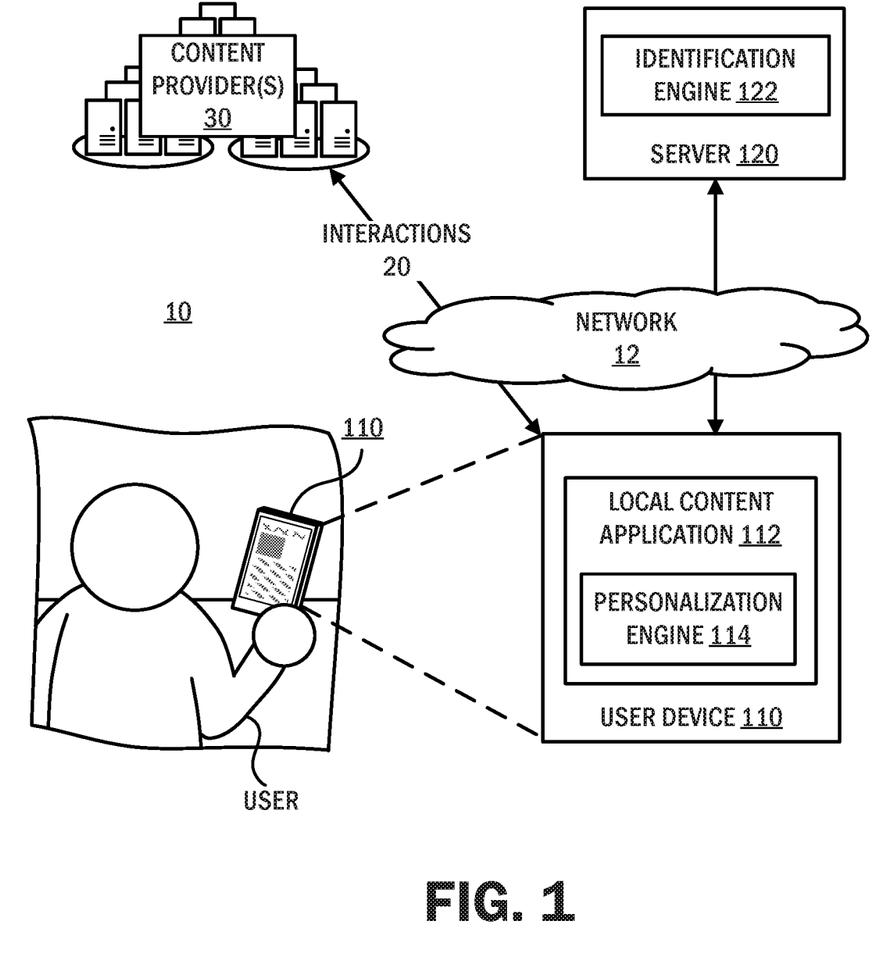
FIG. 1 illustrates a system having a user device that obtains customized identification of content items from a server over a network based on interactions that the user device has with content.

FIG. 1 illustrates a system 10 having a user device 110 configured to obtain identifications of content items from a server 120 over a network 12, where the identifications of content items are customized based on interactions 20 that the user device 110 has with content providers 30. As used herein, identifications of content items that are based on interactions of a user account, for example, as obtained from a user device 110 communicating with the server through the user account can be referred to as customized identifications of content. The network 12 can be an electronic communications network, such as the Internet, over which the user device 110, the server 120, and the content providers 30 can transmit and receive messages.

The content providers 30 can include providers of textual, visual, audio, interactive, other kinds of content, and combinations thereof. Specific kinds of content can include, music, video, images, podcasts, books, and web pages, among others. In many examples, the content providers 30 are server computing devices that provide content items to connecting devices. Though, while the content providers 30 are shown as being separate and remote from the user device 110 and the server 120, in other implementations, the server 120 can directly provide content. In further implementations, one or more applications running on the user device can act as local content providers 30 with which interactions 20 are possible.

The user device 110 is a computing device. In many examples, the user device 110 is a consumer electronics device, such as a phone, tablet, laptop, desktop, smart watch, virtual reality device, augmented reality device, or a content playback device (e.g., a smart speaker), other consumer devices, or combinations thereof. The user device 110 can be, include, or be a part of a computing environment, such as the one described in FIG. 11.

The user device 110 can include a local content application 112 having a personalization engine 114. The local content application 112 is an application executable on the user device 110. In some examples, the local content application 112 can be software downloadable from an application distribution service (e.g., the APPLE APP STORE or GOOGLE PLAY). In other examples, the local content application 112 can be provided as a web application. In an example, instructions for the local content application 112 stored in memory are executed by one or more processors of the user device 110 to provide local content application functionality. Such functionality can include, for example, receiving input from and providing output to a user relating to content.

Figure 8:
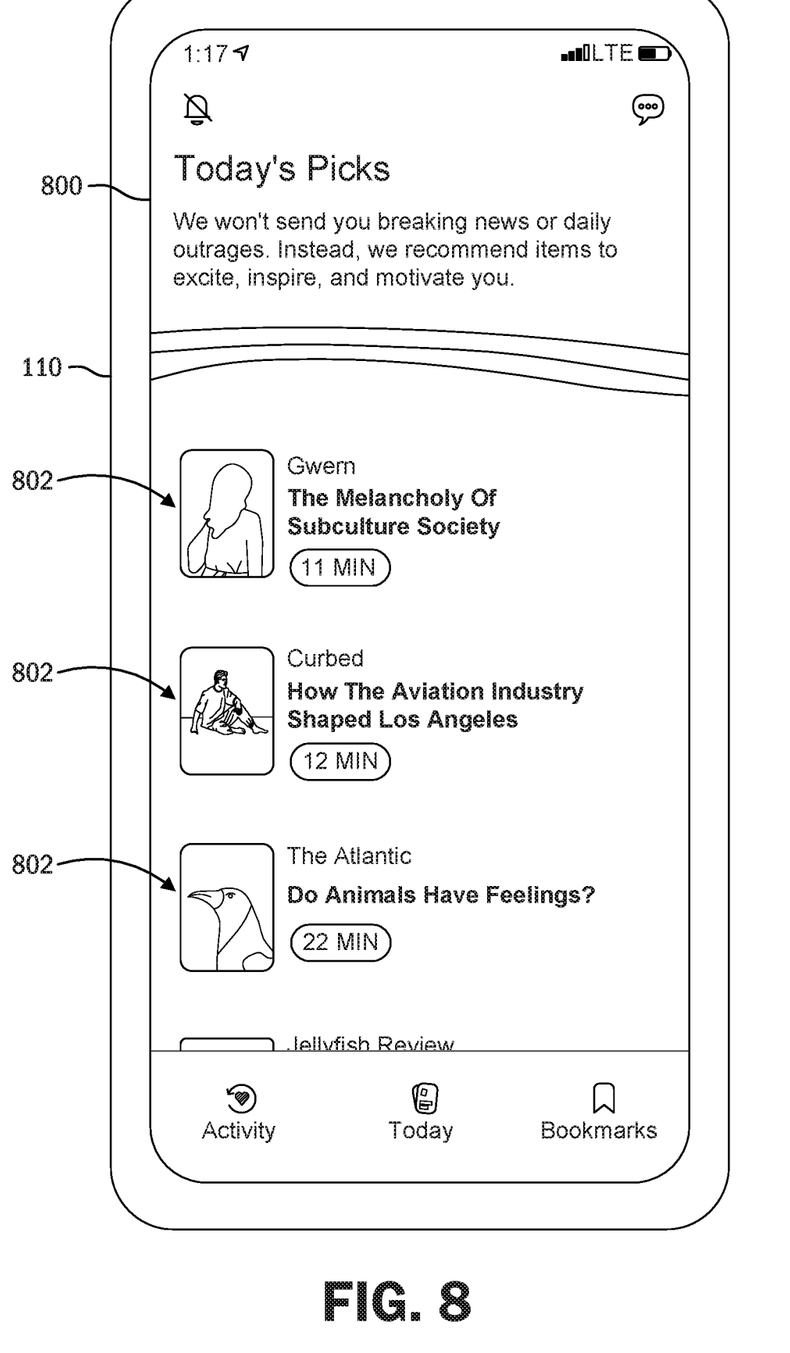
FIG. 8 illustrates the user device displaying a user interface of the local content personalization engine that displays a plurality of representations of the identification of content items.
Figure 9:
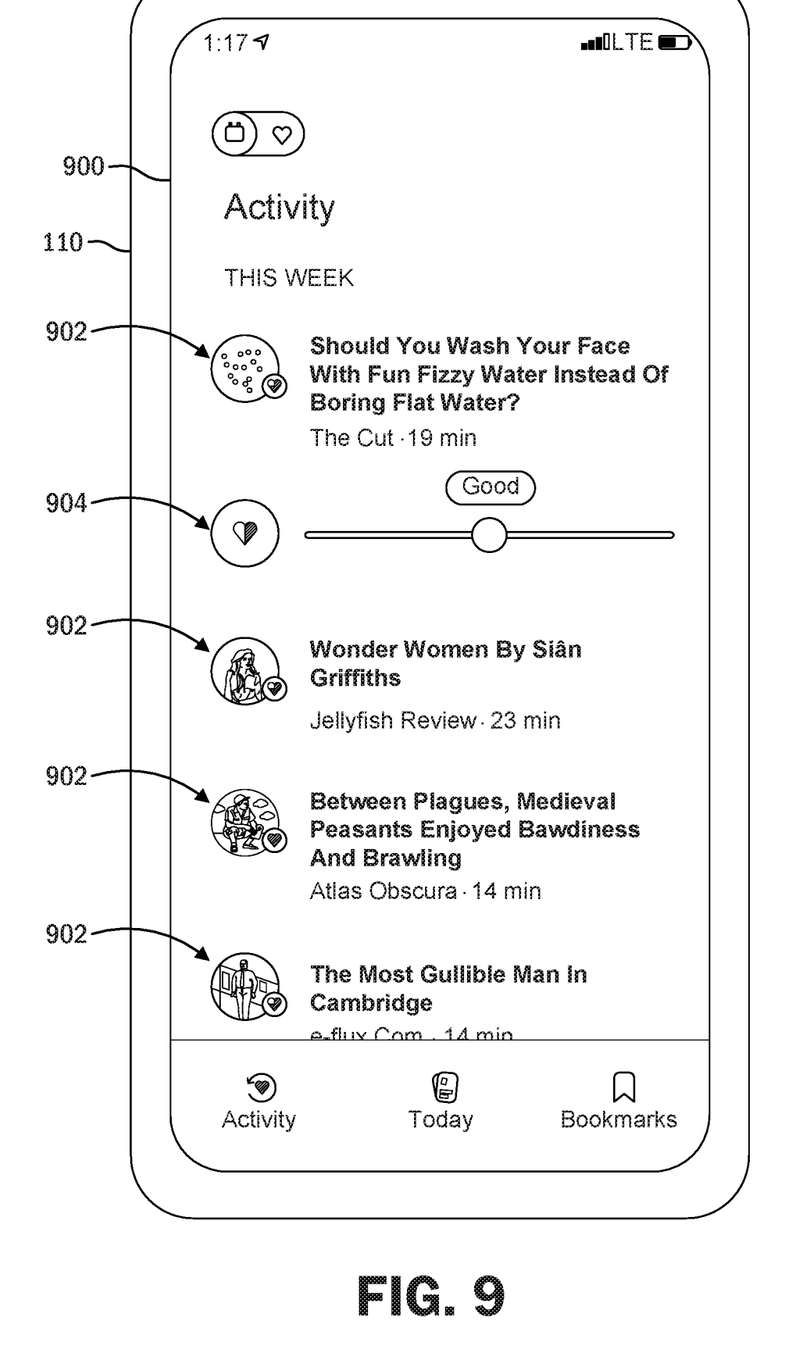
FIG. 9 illustrates the user device displaying an example user interface of the local content personalization engine that displays representations of recently-accessed items and a user interface element for receiving an indication of the user's affinity for an associated item.

In an implementation, the local content application 112 can provide identifications of content items to a user via a user interface (e.g., via a touch screen). Then the local content application 112 can receive input via the user interface user via a user interface of the user device 110 (e.g., via a touch screen) as part of interactions 20 with content items provided by the content providers 30. Some or all of the interactions 20 with the content providers 30 can be based on identifications of content items provided via the local content application 112. In addition, there can be interactions 20 with the content providers 30 that occur without the aid of the local content application 112 or the identification engine 122. Example user interface screens of the local content application 112 are shown in FIGS. 8 and 9.

In some examples, the local content application 112 provides not only identifications of content items (e.g., links to the content with a short description of the content) but also the content itself. For instance, the local content application 112 can be configured to provide the content itself via a web browser (e.g., for text content) or media player (e.g., for video or audio content) of the local content application 112. In other examples, the local content application 112 can be configured to provide, for the user, access to the content via other applications running on the user device 110.

The local content application 112 can provide data to the personalization engine 114 regarding the interactions 20 to facilitate obtaining identifications of content items. For example, the personalization engine 114 can provide certain data regarding the interactions 20 to the server 120 and receive data regarding personalized identification of content items to be provided to the user by the local content application 112.

The personalization engine 114 can be software (e.g., standalone software or integrated with the local content application 112) that provides functionality relating to obtaining identifications of content items. The personalization engine 114 can be a back-end portion of software that provides data to the server 120 and receives identifications of content items from the server 120 to provide to the user via the local content application 112. The personalization engine 114 can be a library or a set of APIs that provide functionality. In some examples, the personalization engine 114 can be part of an operating system running on the user device 110. As described herein, the personalization engine 114 can receive data regarding the interactions 20 with the content providers 30, process the data, and provide processed data to the server 120 to obtain additional identifications of content items. In contrast to traditional content identification technology, the processing and the interactions with the server 120 can be configured such that certain data (e.g., the particular interactions 20 with content providers 30 or the specific identities of the content items) is not shared with the server 120.

The server 120 is a collection of one or more computing devices. The server 120 can be a remotely-accessible computing environment (see, e.g., FIG. 11) that can connect with multiple user devices 110 (e.g., via personalization engines 114 thereof). The server 120 can provide a content identification service via an identification engine 122 running on the server 120. For instance, the server 120 can store identification engine instructions that, when executed by one or more processors of the server 120, cause performance of identification engine functionality as described herein. The identification engine 122 running on the server 120 can aggregate data generated by personalization engine 114 of each user device 110 and use the aggregated data to identify content items based on criteria (e.g., content items for which the user will likely have an affinity). In an example implementation, the identification engine 122 identifies content items based on affinity vectors generated by the personalization engine 114. Example techniques for identifying content items are described below in relation to FIGS. 6 and 7. Example techniques for generating the affinity vectors is described below in relation to FIGS. 2-5.

Generating Affinity Vector

Figure 2:
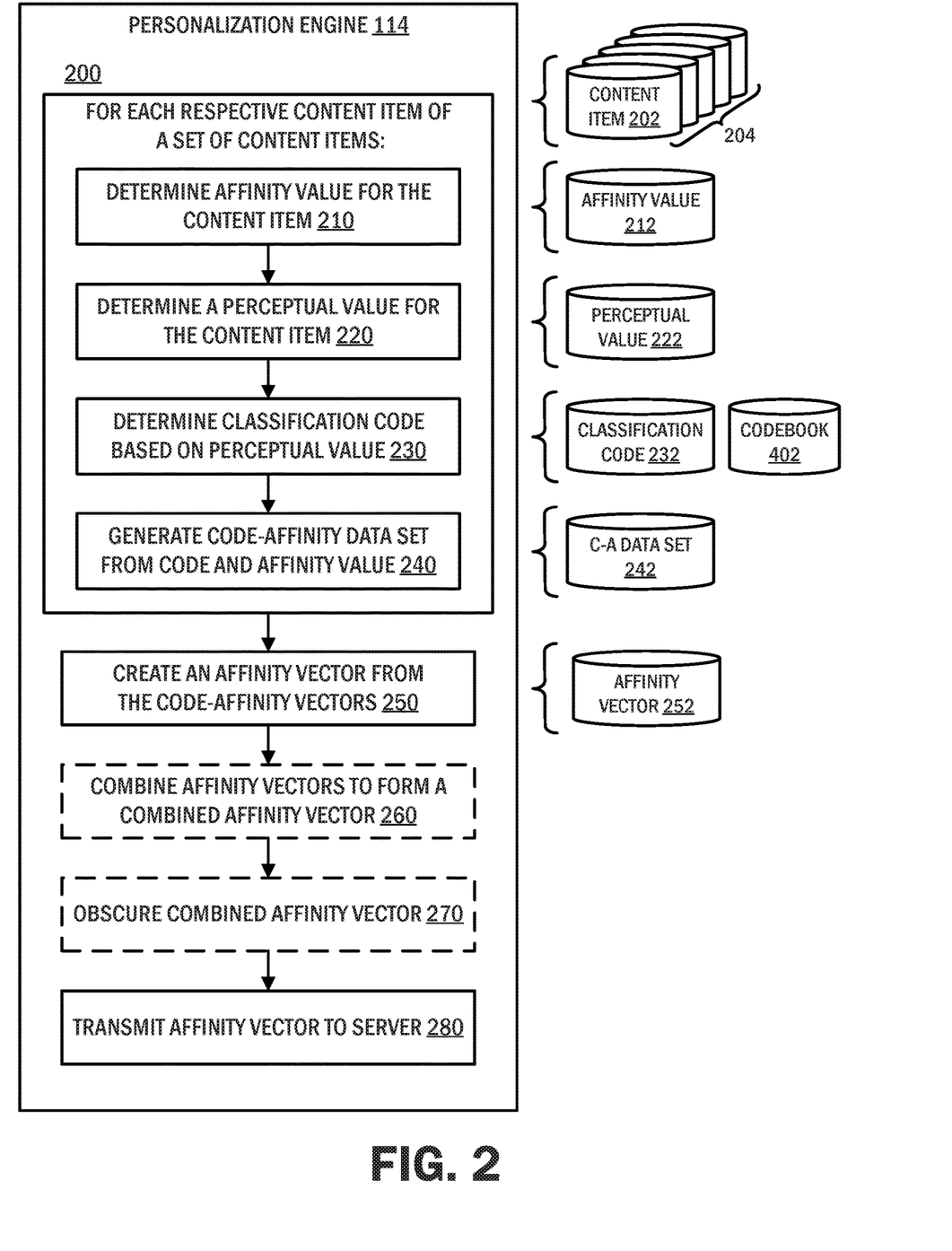
FIG. 2 illustrates a process for generating an affinity vector.

FIG. 2 illustrates a process 200 for generating an affinity vector. As illustrated, the process 200 can be performed by the personalization engine 114. However the operations of the process 200 can be performed in one or more additional or other locations, such as at the server 120. The process 200 is performed with respect to one or more content items 202 that can form a set 204 of one or more content items 202. A content item 202 can be an item of content provided by the content providers 30 with which the user device 110 has interactions 20. The process 200 can encounter the set 204 of content items 202 by the user device 110 accessing the set 204 via the local content application 112 or another application running on the user device 110 (e.g., a media player or web browser). In addition or instead, the set 204 of content items 202 can be received from a user over a user interface of the user device 110.

As illustrated, the process 200 can include several operations being performed for each respective content item 202 of the set 204. For example, operations 210, 220, 230, and 240 can be performed for each respective content item 202 of the set 204.

Operation 210 includes determining an affinity value 212 for a respective content item 202 of the set 204. The affinity value 212 is a value indicating a predicted or actual affinity for the respective content item 202 by a user. The affinity value 212 can be expressed in any of a variety of ways and in any of a variety of levels of granularity. For example, the affinity value 212 can be a value indicating an extent to which the user is believed to have an affinity for the respective content item 202. In addition or instead, the affinity value 212 can be a probability value indicating the predicted likelihood that the user has an affinity for the content item 202. In another example, the affinity value 212 can be with respect to a scale. For instance, the affinity value 212 can be a value between 0.0 and 1.0, where values closer to 0.0 indicate a dislike for the respective content item 202, values closer to 0.5 indicate a neutral feeling toward the respective content item 202 and values closer to 1.0 indicate a like for the respective content item 202. The affinity value 212 can also have one or more values indicating that the personalization engine 114 did not determine an expressed affinity for the respective content item 202.

The affinity value 212 can be determined in any of a variety of ways. The affinity value 212 can be determined based on express indications of like or dislike of the respective content item 202. For instance, the interactions 20 can include an interaction 20 that includes a like button being pressed, a dislike button being pressed, or a rating (e.g., a star rating, a numerical rating, or a letter grade) being given to the respective content item 202. The affinity value 212 can be determined through indirect indications, such as the user device 110 (e.g., the local content application 112 or personalization engine 114 thereof) detecting that a share button, save-for-later button, or purchase button is actuated in conjunction with the respective content item 202. Further still, the affinity value 212 can be determined based on the one or more interactions 20 with the respective content item 202 (e.g., based on an amount of time or intensity of the one or more interactions 20 such that more time or intensity leads to a higher affinity value 212). The affinity value 212 can also be obtained from sources beyond the interactions 20. For example, affinity values 212 or the kind of data that can be transformed into an affinity value 212 can be obtained from another application or resource. In addition or instead, the local content application 112 can present a user interface to the user and prompt the user to express an affinity for the content items 202, which is then received over the user interface (see, e.g., FIG. 9). Interactions 20 and other data can be translated to an affinity value by mapping onto a range of possible affinity values 212. For instance, a 5-star rating can map to a 1.0 value on the above-discussed range, while a 4-star rating can map to a 0.8 value on the range.

Following operation 210, the flow of the process 200 can move to operation 220.

Operation 220 includes determining a perceptual value 222 for the respective content item 202. The perceptual value 222 is a value (e.g., a vector or a single numerical value, such as a floating point number) that represents a projection of the respective content item 202 onto a lower-order perceptual space than a current perceptual space of the respective content item 202. For example, where the respective content item 202 is a piece of music, a magnitude spectra of the audio and average the frames over time can be computed to create a vector (e.g., a vector having a length of 256). That vector can be the perceptual value 222 of the respective content item 202. As another example, a deep learning audio processor model (e.g., AUDIOSET by GOOGLE) can be used to project the audio to form the perceptual value 222 (e.g., into a perceptual value 222 having 127 dimensions). As yet another example, audio analysis services can be used to extract a timbre vector or other vectors for use as or in generating the perceptual value.

As another example, where the respective content item 202 is an image, a deep learning model such as a residual neural network can be hashed to form the perceptual value 222. Alternatively or in addition, color values of the respective content item 202 can be averaged over the pixels and hashed to form the perceptual value 222.

In yet another example, where the respective content item 202 is a text, word embedding generators can be used (e.g., WORD2VEC) or other techniques, such as Latent Dirichlet allocation or latent semantic analysis (LSA), can be used to embed words into a perceptual space and average the embedded words over a document to form the perceptual value 222.

Following operation 220, the flow of the process 200 can move to operation 230.

Operation 230 includes determining a classification code 232 based on the perceptual value 222. The classification code 232 is a code representing a group of related content items 202. The classification code 232 can be determined based on the perceptual value 222 using a codebook 402, such as using the process described in relation to FIG. 4. In an example, this operation 230 includes accessing a locally-stored codebook 402. In an example, the perceptual value 222 is provided as input to a function that performs operations based on the codebook 402 and provides, as output, the classification code 232. While the operation 230 is shown as being performed via the personalization engine 114, the operation 230 can be performed via cooperating with the server 120 or another computer to obtain the classification code 232.

In an example, the generating of one or both of the perceptual value 222 and the classification code 232 is performed in a manner that maintains the privacy of the user with respect to an entity having access to the server. For instance, the generating of the perceptual value 222 or the classification code 232 can be performed by a computing device (e.g., a server) operated by an entity separate from the entity running the server 120. In another example, the particular content item 202 for which a perceptual value 222 is wanted is obscured by also obtaining perceptual values 222 for other content items 202, thereby masking the particular content item 202 for which the perceptual value 222 is wanted. In yet another example, the perceptual value 222 for which the classification code 232 is wanted is obscured (e.g., by adding random data) to resist reverse engineering the perceptual value 222 to determine the actual content item 202 for which the classification code 232 is being obtained.

Following operation 230, the flow of the process can move to operation 240.

Operation 240 includes generating a code-affinity data set 242 from the classification code 232 and the affinity value 212. The code-affinity data set 242 can generally express an amount of affinity for content items 202 having the classification code 232 and can be expressed in any of a variety of ways. In an example, the code-affinity data set 242 can be a vector (e.g., a sparse vector) of length k, where k is the number of possible codes able to be produced in the codebook 402, where the slot corresponding to the classification code 232 has a value set to the affinity value 212. In another example, code-affinity data set 242 is expressed as a pair, with one value corresponding to the classification code 232 and the other value corresponding to the affinity value 212. Following the performance of operation 240, the flow of the process 200 can move to operation 250.

Figure 3:
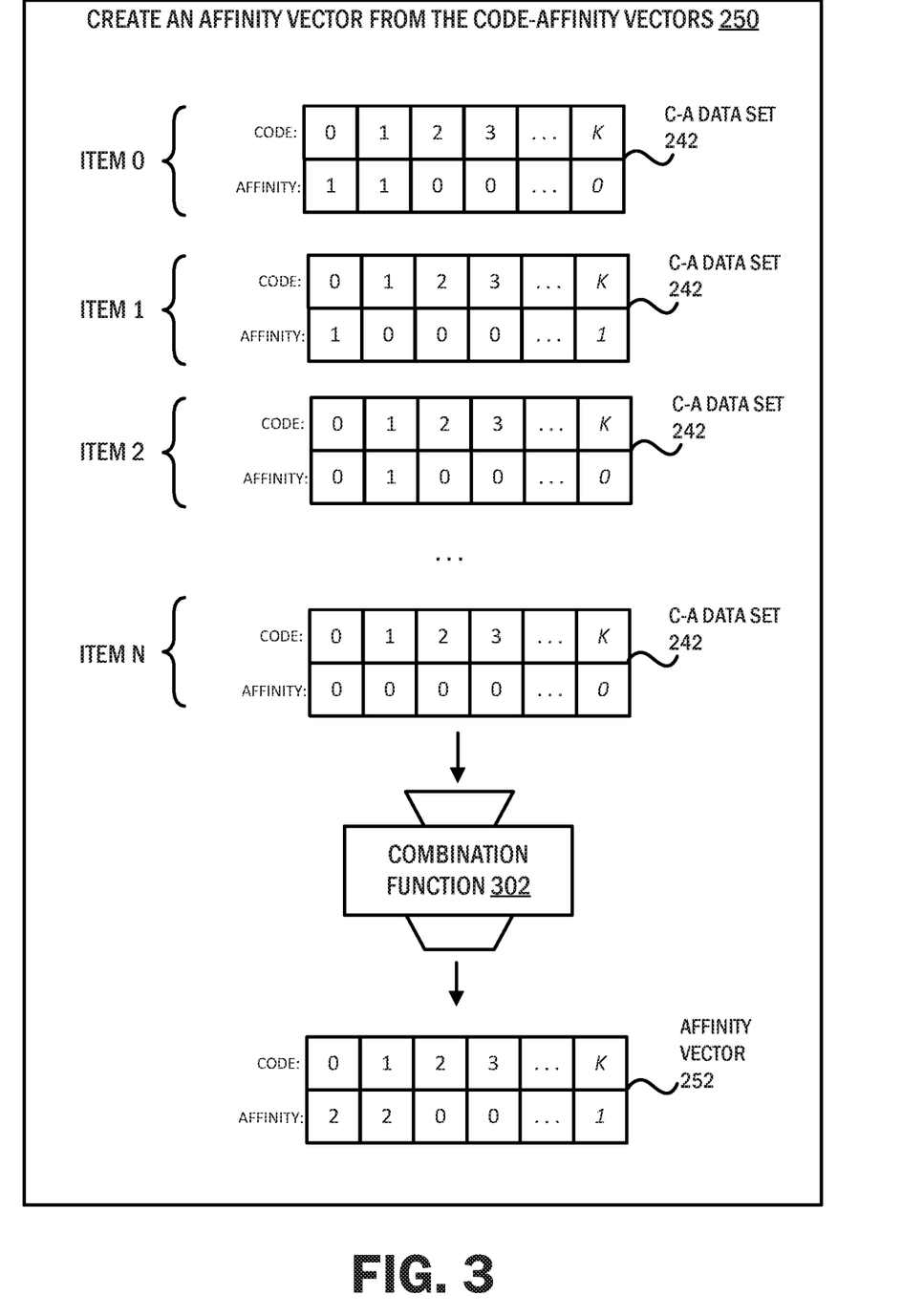
FIG. 3 illustrates the combination of n code-affinity data sets.

Operation 250 includes creating an affinity vector 252 based on the code-affinity data sets 242 produced in operation 240 for the set 204 of content items 202. The resulting affinity vector 252 can represent a relative affinity that the user of the user device 110 has for content from each of the classification codes 232. The affinity vector 252 can be created in any of a variety of ways, such as by averaging the affinity values 212 for each of the classification codes 232. In another example, the code-affinity data sets 242 are vectors, and the vectors are summed to produce the affinity vector 252. An example of such a process is shown in FIG. 3, which illustrates the combination of n code-affinity data sets 242, each corresponding to a different content item. The n code-affinity data sets 242 are combined using a combination function 302. In the illustrated example, the combination function 302 sums the n code-affinity data sets 242 to form the affinity vector 252. As described above, other combination functions 302 can be used, such as averaging the n code-affinity data sets 242 or performing a statistical analysis. Returning to FIG. 2, following operation 250, the flow of the process can move to operation 260.

Operation 260 includes combining affinity vectors 252 of different content types to form a combined affinity vector 252. The affinity vector 252 can be a content-type-specific affinity vector 252. So operation 250 can produce multiple different affinity vectors 252. While those affinity vectors 252 can be kept separate, in some examples, the affinity vectors 252 are combined into a single combined affinity vector 252. For example, each affinity vector 252 of the different content type can be concatenated together. For example, there may be an affinity vector 252 for music having a length of 10,000, an affinity vector 252 for photos having a length of 100,000, and an affinity vector 252 for webpages having a length of 50,000. These affinity vectors can be concatenated together to form a combined affinity vector 252 having a length of 160,000 that represents the known affinity values 212 per classification codes 232 across the different content types. Advantageously, this can be used to allow for cross-content-type correlations to be uncovered: for example, there can be a link between an affinity for music item X and an affinity for web page item Y. Following operation 260, the flow of the process can move to operation 270.

Operation 270 includes obscuring the combined affinity vector 252 (or the affinity vector 252 where operation 260 was not performed). The obscuring can include performing one or more operations to increase a difficulty in reverse engineering the combined affinity vector 252 to determine data usable to specifically-identify the user or the specific content items 202 that went into producing the combined affinity vector 252. For instance, noise can be added to the combined affinity vector 252 to resist recognition of individual content items 202 or the identity of the user based on reverse engineering the obscured affinity vector 252. This operation 270 can include performing one or more differential privacy operations. Following operation 270, the flow of the process can move to operation 280.

Operation 280 includes transmitting the combined affinity vector 252 (or the affinity vector 252 where operation 260 was not performed) to the server 120. This can include making an API call using an API provided by the identification engine 122.

Codebook

As described above, the codebook 402 can be used to determine a classification code 232 based on provided perceptual values 222. The codebook 402 can be created at the user device 110, the server 120, another location, or combinations thereof. In an example, the codebooks 402 are created on the server 120 and transmitted to and stored at user devices 110. The codebooks 402 can be periodically updated and re-generated over time. For instance, the server 120 can produce the codebooks 402 and transmit the codebooks 402 wholly or as updates to user devices 110. An example codebook 402 creation process is described in FIG. 4.

Figure 4:
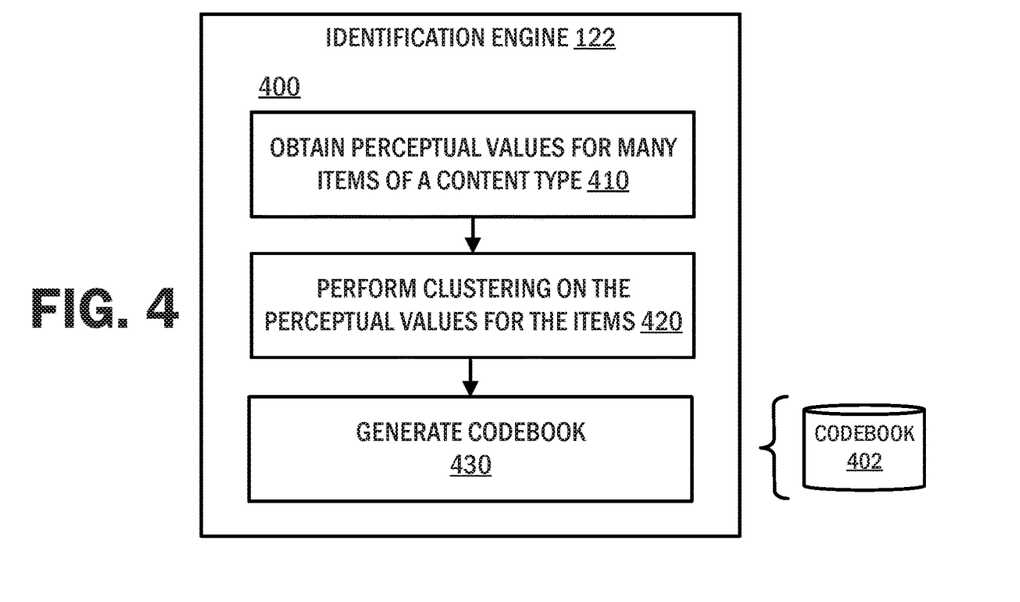
FIG. 4 illustrates an example process for producing a codebook.

FIG. 4 illustrates an example process 400 for producing a codebook 402. The process 400 can begin with operation 410. Operation 410 includes obtaining perceptual values 222 for many content items 202 of a content type. For example, the perceptual values 222 generated during operation 220 can be stored and then obtained as part of this operation 410. In some examples, the server 120 provides a crawler that obtains content items 202 and converts the obtained content items 202 to perceptual values 222. Following operation 410, the flow of the process 400 can move to operation 420.

Operation 420 includes performing clustering on the perceptual values 222. As discussed above, the perceptual values 222 are values that represent a projection of the respective content item 202 onto a lower-order perceptual space than the respective content item 202. Once a sufficient number of perceptual values 222 are created, clustering can be performed on the lower-order perceptual space to identify clusters of the perceptual values 222. In some examples, K-means clustering is used to perform the clustering. Other examples use other types of clustering, such as principal component analysis (PCA), t-Distributed Stochastic Neighbor Embedding (t-SNE), hierarchical clustering, vector quantization (VQ), another technique, or combinations thereof. In an example, a cluster size k that is smaller than a total space of items is used. If k is 10,000, each song in a universe of songs can be assigned a code between 0 and 9,999, where the codes are indexed from zero. The operation 420 can be performed on a per-media-type basis. For instance, there can be separate codebooks 402 for each category of content supported by the system 10.

Figure 5:
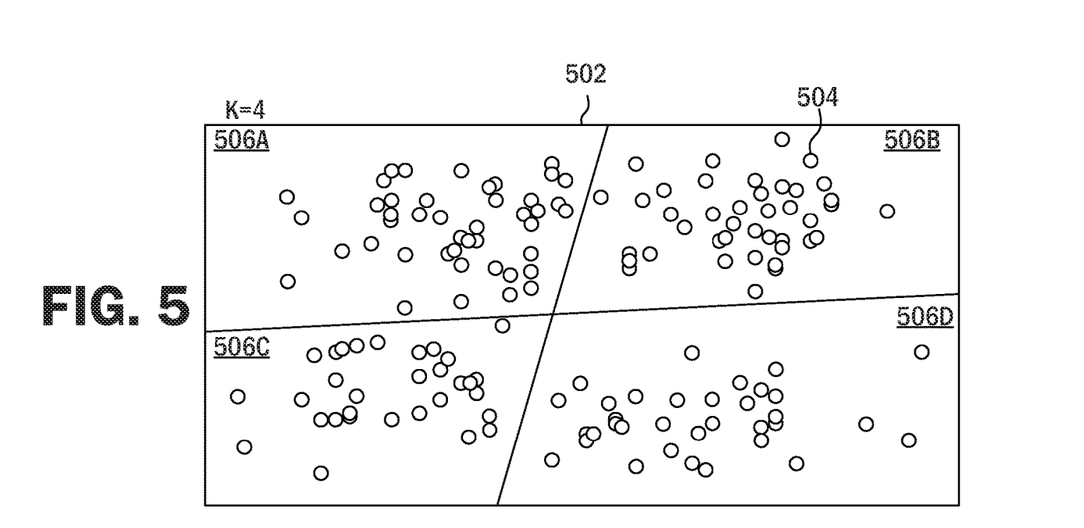
FIG. 5 illustrates an example representation of clustering in an embedding space of perceptual values of items.

FIG. 5 illustrates an example representation of clustering in an embedding space 502 of perceptual values 222 representing items 504 in the embedding space 502. Each item 504 in the embedding space 502 is clustered into one of k different clusters 506. In this example, for ease of understanding, there are four different clusters: 506A, 506B, 506C, and 506D. In a simplified example, the items 504 are articles and the clusters 506 represent groupings of similar articles. For example, one of the clusters 506 can be articles about sports, another of the clusters 506 can be articles about technology, yet another of the clusters of articles about politics, and a final of the clusters 506 can be fiction. Of course, in many examples, there will be many more than four clusters and because the clustering would likely be based on statistical analyses of perceptual values 222, the clusters 506 are unlikely to fall into neat, easily-expressed categories, such as sports, technology, politics, and fiction.

Returning to FIG. 4, following or during operation 420, the flow of the process 400 can move to operation 430. Operation 430 includes generating the codebook 402. In some examples, the generating of the codebook 402 is performed as part of the clustering. For instance, performing k-means clustering can include the generating of the codebook 402. For example, the centroids identified can correspond to codes in the codebook 402. Each code can represent one of the locations of the centroid. A code can be determined for a perceptual value 222 based on the codebook 402 by, for example, determining a code corresponding to a centroid having a smallest distance from the perceptual value 222 in the embedding space 502.

After the codebook 402 is generated, the codebook 402 can be used as part of the affinity vector 252 generation process 200 discussed above. Once generated, the affinity vector 252 can be used to identify content, such as using the process described in FIG. 6.

Identification

Figure 6:
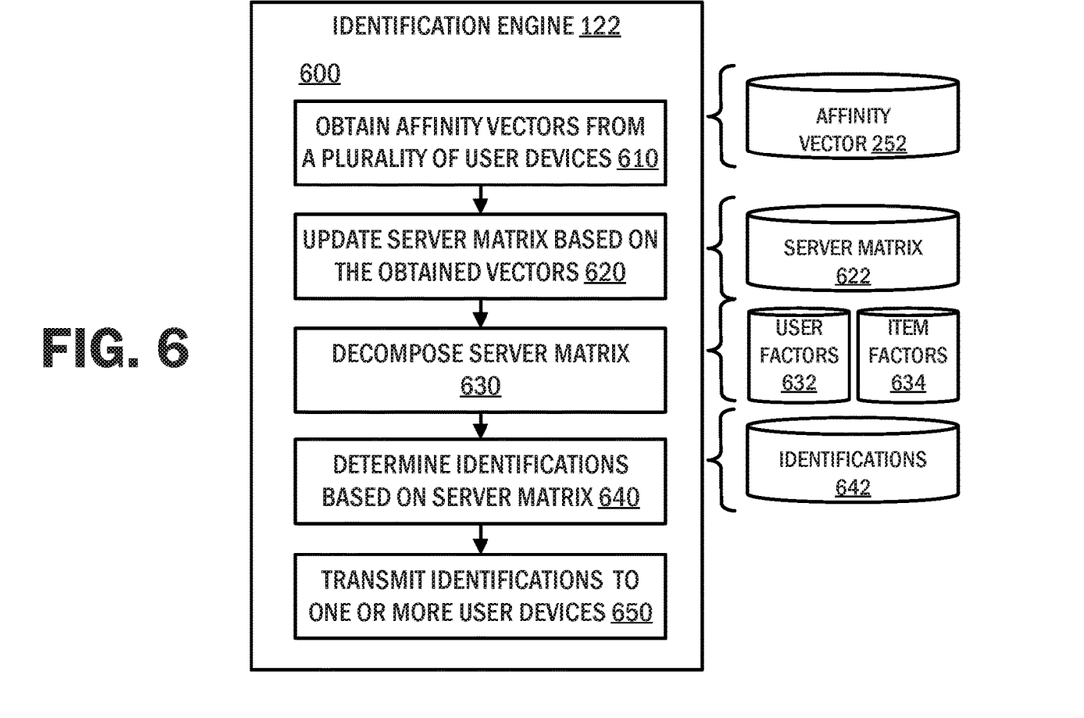
FIG. 6 illustrates an example process for providing one or more identifications of content items.

FIG. 6 illustrates an example process 600 for providing one or more identifications 642 of content items. The identifications can be personalized identifications of content items 202 based on an associated affinity vector 252. As illustrated, the process 600 is performed by the identification engine 122 of the server 120. In other examples, the process 600 can be performed at least in part by other devices or combinations of devices. The process 600 can include operation 610.

Operation 610 includes obtaining affinity vectors 252 from a plurality of user devices 110. For example, the server 120 can receive a combined affinity vector 252 from each device. The affinity vectors 252 can be received as a result of the affinity vectors 252 being transmitted to the server 120 as described above in operation 280. The obtaining can occur in any of a variety of ways. For example, combined affinity vectors 252 can be pushed or pulled from the user device 110 periodically. The server 120 can receive other information as part of this operation 610, such as an identifier (e.g., a device or user identifier), such as can be used with API calls. The identifiers can be anonymized. Following operation 610, the flow of the process 600 can move to operation 620.

Figure 7:
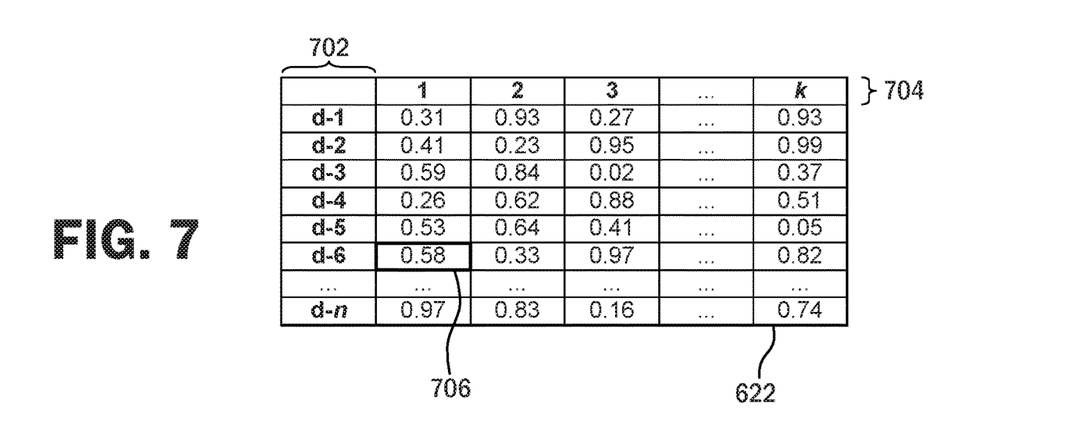
FIG. 7 illustrates an implementation of the server matrix.

Operation 620 includes updating a server matrix 622 based on the obtained affinity vectors 252. FIG. 7 illustrates an implementation of the server matrix 622. As illustrated, the server matrix 622 can be a matrix storing affinity values 706 indexed by row and column. In an example, rows correspond to identifiers 702 (e.g., device or user identifiers as received in operation 610) and the columns correspond to codes 704 (e.g., the codes in the combined affinity vectors 252. Updating the server matrix 622 can include updating affinity values 706 in the server matrix 622 with changes in values based on the affinity vectors 252. Returning to FIG. 6, following operation 620, the flow of the process can move to operation 630.

Operation 630 includes decomposing the server matrix 622. For example, a regularly running matrix factorization process can decompose the server matrix 622 into lower rank matrices of user factors 632 and item factors 634. Various kinds of matrix factorization systems can be used, such as non-negative matrix factorization. Using the affinity vector 252 and an estimate of the item factors 634, the device's low rank user factors vector 632 can be estimated. Multiplying the user factors 632 by the item factors 634 can yield predicted affinities for a given device for all codes. Following operation 630, the flow of the process 600 can move to operation 640.

Operation 640 includes determining identifications 642 of content items 202 based on the server matrix 622. For example, the identifications 642 can be made for a user based on the affinity values 706 associated with an associated identifier 702 and code 704. For instance, highest-affinity codes 704 for a given identifier 702 can be converted into identifications 642 across each of the media types. While there can be a long list of possible items, the distance between an item 202 being considered for identification and an associated entry in the codebook 402 (e.g., a centroid associated with a given code) can be used to find better suited items. In some embodiments, the distribution of predicted codes per user can be used to find better suited items, as each item will have a natural code distribution. In many examples one-hot encoding is not used and code membership is not destroyed when enrolling items. The user device 110 or third party can maintain a lookup between content items 202 and classification codes 232 to increase a difficulty for the server 120 or an owner of the server 120 to discern the affinities for an individual user.

In some examples, the server 120 receives a number of potential content items 202 for potential identification from a human or computer curator. Then the potential content items 202 can be converted into perceptual values 222 and then into classification codes 232, which are then used to look up an associated affinity value 706 for the user in the server matrix 622. Then, the potential content items 202 can be selected based on respective affinity values 706. For example, one or more of the highest-ranking content items 202 or content items 202 having a ranking above a threshold can be selected as the identifications 642 of content items 202 to be provided to the user.

Following operation 640, the flow of the process 600 can move to operation 650.

Operation 650 includes transmitting one or more of the identifications 642 to the one or more user devices 110. For example, the server 120 can transmit the content items 202 associated with the identifications 642 themselves or links or identifiers of the content items 202 so they can be accessed by the user device 110. The transmission can be a push or pull transmission.

The local content application 112 can provide access to the identifications 642 for the user. For instance, FIG. 8 illustrates the user device 110 displaying a user interface 800 of the local content application 112 that displays a plurality of representations 802 of the identifications 642. The representations 802 can further provide information about an associated content item 202 (e.g., the author, title, an associated image, and an estimated reading time) as well as a link to access the content item 202. In addition, the local content application 112 can provide a user interface for obtaining information about a user's affinity for the particular content items 202. An example of such a user interface is shown in FIG. 9.

FIG. 9 illustrates the user device 110 displaying an example user interface 900 of the local content application 112 that displays representations 902 of recently-accessed content items 202 and a user interface element 904 for receiving an indication of the user's affinity for an associated content item 202. In the illustrated example, the user interface element 904 is in the form of a slider, but other elements can be used.

ADDITIONAL EXAMPLE

Figure 10:
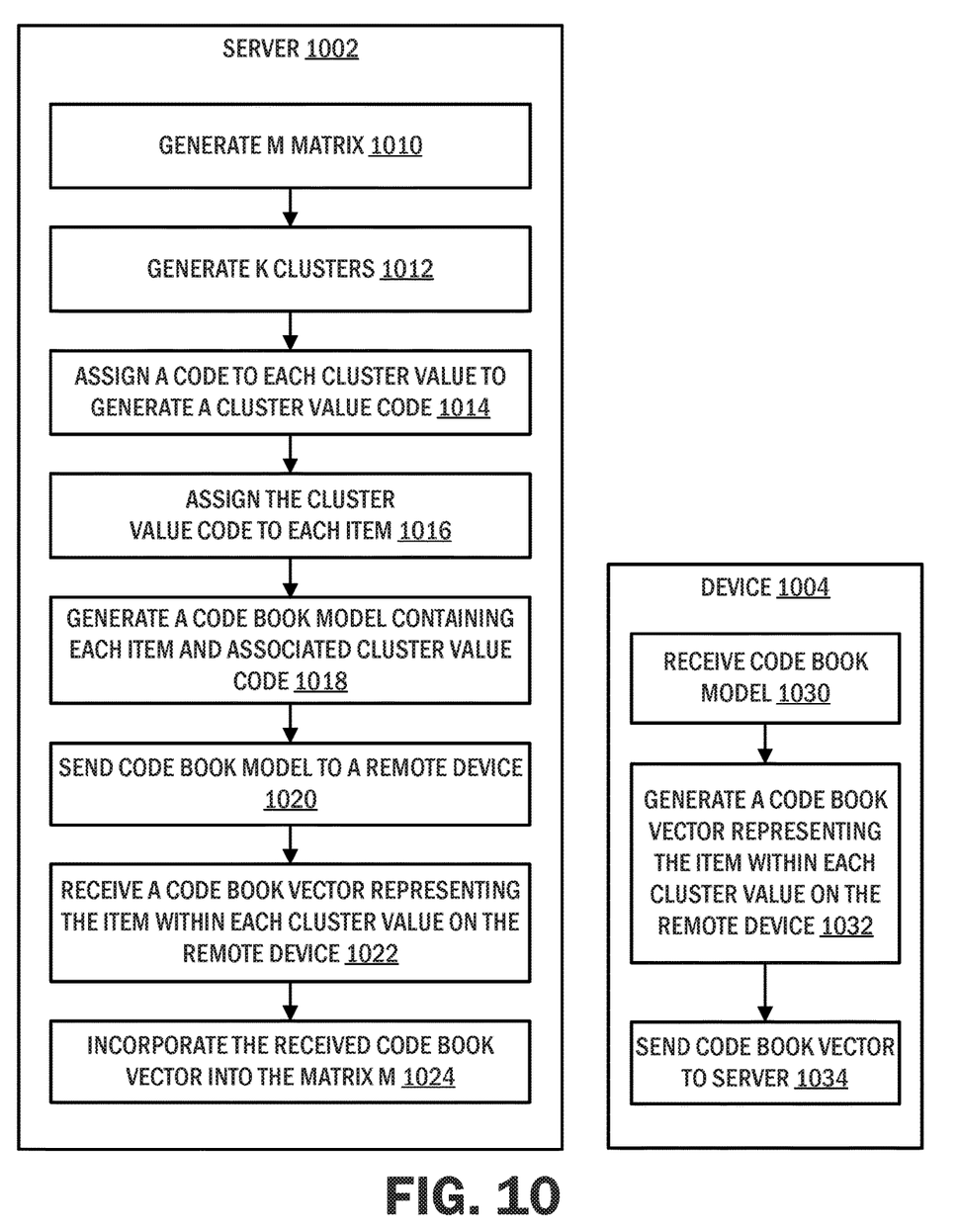
FIG. 10 illustrates an example cross media personalization system.

FIG. 10 illustrates an additional example implementation with operations being performed on a server 1002 and on another device 1004 for keeping data locally private, which is described in terms of an example cross media personalization system. A cross media personalization engine that keeps data locally private is provided. For a given user and device 1004, items across domains that they will like are predicted based on the interactions of the user with any type of media. The interaction data stays local to the device 1004, and a server 1002 only obtains access to a latent projection that is relatively hard to invert. This lets users obtain targeted discovery without having any external service obtain access to the users' individual interactions which would otherwise be accessible from conventional devices.

In the example embodiment, a task of personalization is split into two parts, one that can run on a device 1004 (e.g., of a user), and one that runs on a server 1002.

In operation 1010, a user-item matrix M is built, where $M(i, j)$ is a known affinity between a user i and an item j. The server maintains an M matrix, where each row represents a device, and each column represents a perceptual hash of an item. A perceptual hash is computed on the device of each item. The content of each item is, in turn, projected into a lower-rank perceptual space. For example, for music, a magnitude spectra of the audio and average of the frames over time is computed to create a vector of length 256. Optionally, a deep learning audio processor model, such as AudioSet by GOOGLE, can be used to project the audio to 127 dimensions. Optionally, audio analysis can be used to extract the timbre vector, of size 20 per music file.

Once, for example, thousands of such media items are projected through a lower rank embedding, items are clustered into a codebook. In operation 1012, k clusters are generated. For example, K-means clustering can be used to partition the data space. It should be understood that any type of clustering can be used, such as principal component analysis (PCA), t-Distributed Stochastic Neighbor Embedding (t-SNE), hierarchical clustering, vector quantization (VQ), etc. In one example implementation, a cluster size, k, that is smaller than a total space of items can be used. If k is, for example 10,000, each song in a known universe of songs is assigned a code between 0 and 9,999. In operation 1014, a code is assigned to each cluster value to generate a cluster value code. In operation 1016, a cluster value code is assigned to each item. In operation 1018, a code book model is generated that contains each item and associated cluster value code. The codebook model (that can be used to translate an embedding to a code number) is saved and stored on the devices (e.g., of users). For example, in operation 1020, the code book model is sent to a remote device 1004.

In operation 1030, the device 1004 receives the codebook model. In operation 1032, a code book vector representing the item within each cluster value is generated. For instance, for a given user u, the embedding and the code for each media item is computed on the device of user u. The embedding operation runs locally on the device, and the code can be computed two ways: either locally on the device (assuming the codebook is stored in the device and updated from the server when codebook changes occur), or the hash itself is sent to the server and the code is computed there. Given, for example, 100 songs a user has affinity for, all the codes in a sparse vector of size k are summed. Alternatively, a known weighting (star rating, number of interactions, etc.) is used to modify the affinity metric per code. This ends with a k long vector per item type on the device.

Other item types can be and are used, such as photos (also referred to as images). For photos a deep learning model such as ResNet is hashed through. Alternatively, the color values averaged over the pixels are hashed through.

In yet another example embodiment text documents are used. For text documents, Word2Vec or Latent Dirichlet allocation (LDA) or latent semantic analysis (LSA) can be used to embed words into a perceptual space and average them over a document. The clustering step is per media type: there is a separate codebook for music, video, images, podcasts, books, web pages, etc. Each codebook knows the embedding type and can convert the media-specific embedding into a code number.

Each code vector per media type is concatenated together. In the use case of analyzing and predicting music, photos and web pages, and using, for example, k0=10,000 for music, k1=100,000 for photos, and k2=50,000 for webpages, a single device emits a 160,000 long vector, which each item representing the users' known affinity per code across 3 domains.

In operation 1034, the device 1004 sends a code book vector to the server 1002. But before sending to the server 1002, optionally, noise can be added to the vector to further ensure that no single item or user can be identified, or reverse engineered back to the original item/user correlation. This approach is related to differential privacy.

In operation 1022, the server 1002 receives the per device code vector. In operation 1024, the server 1002 incorporates the received code book vector into the matrix M For example, the server 1002 updates its M with the new information. A regularly running matrix factorization decomposes M into lower rank matrices W of user factors and H of item factors. Non-negative matrix factorization can be used as well, but can use any matrix factorization system given a device's code-vector and our most recent estimate of the codebook factors H, the device's low rank vector w can be estimated. Multiplying w by H yields the predicted affinities for the device across all codes.

New items can be predicted for a user, given their highest affinity predicted codes per media type. The device or third party can maintain a lookup between item identifiers and their codes, so that the server cannot discern the affinity for an individual user. Given this lookup, the highest affinity codes can be converted into an item suggestion list across each of the domains. The concatenated vectors allow for cross-domain correlations to be uncovered: for example, there can be a link between music item X and web page item Y. A single code per item type can be a long list of possible items, and the distance between an item and its codebook entry can be used to find better suited items. In some embodiments, the distribution of predicted codes per user can be used to find better suited items, as each item will have a natural code distribution (that is, use one-hot encoding cannot be used and thus destroy code membership while enrolling items.).

Computing Environment

The example embodiments described herein may be implemented using hardware, software or a combination thereof and may be implemented in one or more computer systems or other processing systems. Useful machines for performing the operation of the example embodiments presented herein include general purpose digital computers or similar devices. The user device 110 and the server 120 can be implemented with some or all of the features and components of the computing environment described in FIG. 11.

Figure 11:
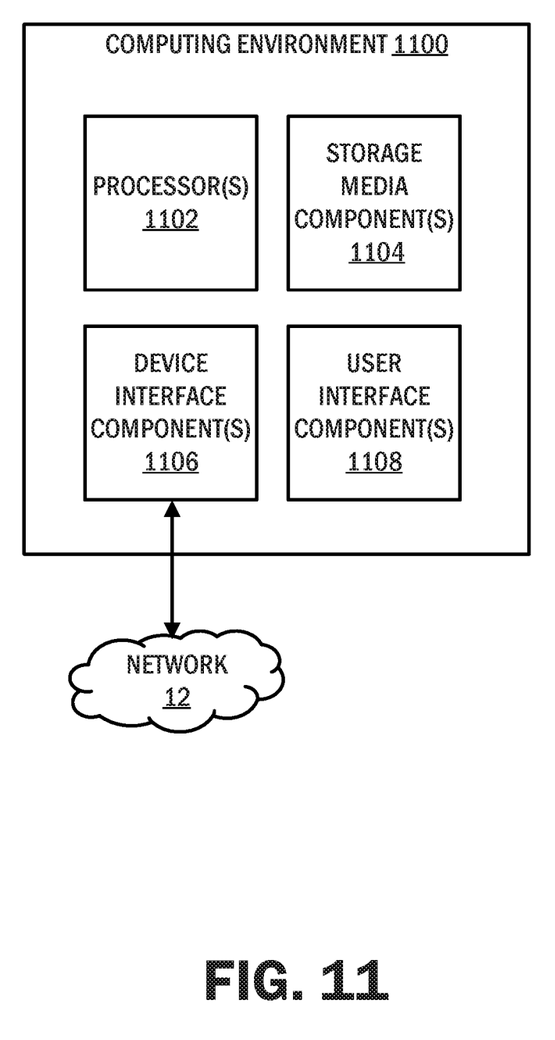
FIG. 11 illustrates a computing environment with which one or more examples herein can be implemented, such as the user device and the server.

FIG. 11 illustrates a computing environment 1100 usable to implement one or more examples herein, such as the user device 110 and the server 120. In the illustrated example, the computing environment includes one or more processors 1102, one or more storage media components 1104, one or more device interface components 1106, and one or more user interface components 1108.

The one or more processors 1102 can be microprocessors that can perform operations based on instructions, such as the arithmetic and logical operations required for program execution. The one or more processors 1102 can be one or more CPUs (Central Processing Units).

The storage media component(s) 1104 can include components for storing instructions, data, or combinations thereof, such as transitory or non-transitory computer-readable mediums. The storage media components 1104 can include one or more hard disk drives, solid state drives, or memory cards (e.g., flash memory) for program and data storage. In examples, the storage media components 1104 can include random access memory components for temporary data and program instruction storage. Further examples include floppy diskettes, optical disks (e.g., CD-ROMs or DVDs), and magneto-optical disks or other types of media/machine-readable medium suitable for storing or transmitting electronic instructions. The storage media component 1104 can store, among other things, instructions that, when executed by the one or more processors 1102, direct the one or more processors 1102 to perform operations or functions (e.g., transmission and reception functions). In many examples, the storage media components 1104 can store data and instructions for the execution of an operating system (e.g., a LINUX, WINDOWS, or MACOS operating system). As is well known in the art, processors 1102 can run different operating systems and can run different types of software. Such software can include software directed to different functions, such as handling and managing data from a particular source, or transforming data/information from one format into another format. It should thus be clear that the embodiments described herein are not to be construed as being limited for use with any particular type of server computer, and that any other suitable type of device for facilitating the exchange and storage of information may be used instead.

The device interface components 1106 are one or more components configured for the computing environment 1100 to communicate with one or more other computers, such as via the network 12 or via an ad-hoc connection. The device interface components 1106 can include wireless communication components (e.g., configured to communicate via BLUETOOTH, WI-FI, or a cellular data connection, such as 3G, 4G or 5G) or wired communication components. The device interface components 1106 can adhere to various protocols such as the ETHERNET, ATM (asynchronous transfer mode), TCP/IP protocols or other connection or connection-less protocols.

The user interface components 1108 are one or more components configured to receive input from or provide output to a user of the computing environment 1100. The user interface components 1108 can include: displays, touch-sensitive components (e.g., a touch-sensitive display), buttons (e.g., arranged into a virtual or physical keyboard), mice, cameras, speakers, microphones, other components and combinations thereof.

While various example embodiments have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents. After reading the foregoing description, it will be apparent to one skilled in the relevant art(s) how to implement the foregoing example embodiments in alternative embodiments (e.g., involving any transaction systems that request personalized data from a remote device).

Software embodiments of the example embodiments presented herein can be provided as a computer program product, or software, that may include an article of manufacture on a non-transitory computer-readable medium. The instructions on the computer-medium can be used to program a computer system or other electronic device. The techniques described herein are not limited to any particular software configuration. They may find applicability in any computing or processing environment. The terms "machine accessible medium", "machine readable medium" and "computer-readable medium" can include any non-transitory medium that is capable of storing, encoding, or transmitting a sequence of instructions for execution by the machine (e.g., by one or more processors) and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

The invention claimed is:

1. A method comprising:
  for each respective content item of a set of content items:
    determining an affinity value indicating a liking of a user for the respective content item, the determining based on data regarding one or more user interactions with the respective content item, wherein the one or more user interactions includes a selected like button, a selected dislike button, or a rating corresponding to the respective content item;
    determining a perceptual value for the respective content item, wherein the perceptual value represents a projection of the respective content item onto a lower-order perceptual space; and
    determining a classification code, based on the perceptual value for the respective content item, representing a group of related content items including the respective content item, wherein determining the classification code maintains user privacy by obscuring the classification code;
  creating an affinity vector from affinity values and the classification codes determined for the each respective content item of the set of content items, wherein the affinity vector relates one of the affinity values to a corresponding one of the classification codes for the set of content items;
  transmitting the affinity vector to a server;
  receiving, from the server, one or more identifications of content items based on the transmitted affinity vector; and
  outputting the one or more identifications of content items on a user interface of a user device.

2. The method of claim 1, wherein determining the classification code further includes: determining the classification code based on the perceptual value using a codebook.

3. The method of claim 2, further comprising: receiving the codebook from the server.

4. The method of claim 2, further comprising: generating the codebook based on clustering performed on perceptual values.

5. The method of claim 1, wherein determining the affinity value is further based on an affinity expressed by the user for the respective content item.

6. The method of claim 1, further comprising: combining multiple affinity vectors, each associated with a different content type, to form a combined affinity vector, wherein transmitting the affinity vector to the server includes transmitting the affinity vector as part of the combined affinity vector.

7. The method of claim 1, further comprising obscuring the affinity vector prior to transmitting the affinity vector to the server.

8. The method of claim 1, wherein the method is performed by a personalization engine operating on a user device.

9. A non-transitory computer-readable medium comprising instructions that, when executed by one or more processors, cause the one or more processors to:
  for each respective content item of a set of content items:
    determine an affinity value indicating a liking of a user for the respective content item, the determining based on data regarding one or more user interactions with the respective content item, wherein the one or more user interactions includes a selected like button, a selected dislike button, or a rating corresponding to the respective content item; and
    determine a perceptual value for the respective content item, wherein the perceptual value represents a projection of the respective content item onto a lower-order perceptual space; and determine a classification code, based on the perceptual value for the respective content item, representing a group of related content items including the respective content item, wherein determining the classification code maintains user privacy by obscuring the classification code;

create an affinity vector from affinity values and the classification codes determined for the each respective content item of the set of content items, wherein the affinity vector relates one of the affinity values to a corresponding one of the classification codes for the set of content items;

transmit the affinity vector to a server;

receive, from the server, one or more identifications based on the transmitted affinity vector; and output the one or more identifications of content items on a user interface of a user device.

10. The non-transitory computer-readable medium of claim 9, wherein to determine the classification code further includes: determining the classification code based on the perceptual value using a codebook received from the server.

11. The non-transitory computer-readable medium of claim 9, wherein to determine the affinity value is further based on an affinity expressed by the user for the respective content item.

12. The method of claim 1, further comprising obscuring the respective content item for which the perceptual value pertains at least in part by masking with perceptual values for other content items.

13. The method of claim 1, further comprising obscuring the respective content item for which the perceptual value pertains at least in part by adding random data.

14. The method of claim 1, wherein the affinity vector represents a relative affinity that the user has for content associated with each of the classification codes.

15. The method of claim 14, wherein creating the affinity vector further comprises generating a code-affinity data set that indicates an amount of user affinity for each of the set of content items having an associated classification code.

16. The method of claim 2, wherein the affinity vector is expressed by at least one of: a vector having a length indicating a number of possible codes in the codebook corresponding to a classification code, or a pair of values consisting essentially of a classification code and an affinity value.

17. An apparatus comprising a processor coupled the a memory and to a video output, the memory holding instructions that when executed by the processor cause the apparatus to perform:

for each respective content item of a set of content items:
determining an affinity value indicating a liking of a user for the respective content item, the determining based on data regarding one or more user interactions with the respective content item, wherein the one or more user interactions includes a selected like button, a selected dislike button, or a rating corresponding to the respective content item; and determining a perceptual value for the respective content item, wherein the perceptual value represents a projection of the respective content item onto a lower-order perceptual space; and determining a classification code, based on the perceptual value for the respective content item, representing a group of related content items including the respective content item, wherein determining the classification code maintains user privacy by obscuring the classification code;

creating an affinity vector from affinity values and the classification codes determined for the each respective content item of the set of content items, wherein the affinity vector relates one of the affinity values to a corresponding one of the classification codes for the set of content items;

transmitting the affinity vector to a server;

receiving, from the server, one or more identifications of content items based on the transmitted affinity vector; and outputting the one or more identifications of content items on a user interface of a user device.

* * * * *

UNITED STATES PATENT AND TRADEMARK OFFICE
CERTIFICATE OF CORRECTION

Page 1 of 1

PATENT NO. : 12,167,060 B2
APPLICATION NO. : 16/667331
DATED : December 10, 2024
INVENTOR(S) : Brian A. Whitman, Erica R. Greene and Benjamin Recht It is certified that error appears in the above-identified patent and that said Letters Patent is hereby corrected as shown below:

In the Claims

In Column 18, Line 7, after "coupled" delete "the".

Signed and Sealed this
Twenty-first Day of January, 2025

Coke Morgan Stewart
*Acting Director of the United States Patent and Trademark Office*